United States Patent [19]
Feinleib et al.

[11] 4,399,356
[45] Aug. 16, 1983

[54] OPTICAL WAVEFRONT SENSING SYSTEM

[75] Inventors: Julius M. Feinleib, Cambridge; John K. Bowker, Beverly Farms; Lawrence E. Schmutz, Cambridge; Steven J. Tubbs; Michael Shao, both of Watertown, all of Mass.

[73] Assignee: Adaptive Optics Associates, Inc., Cambridge, Mass.

[21] Appl. No.: 226,038

[22] Filed: Jan. 19, 1981

[51] Int. Cl.³ .............................................. G01J 1/20
[52] U.S. Cl. ............................... 250/201; 356/121
[58] Field of Search ............... 356/121, 152; 250/201

[56] References Cited

U.S. PATENT DOCUMENTS

| | | | |
|---|---|---|---|
| 3,861,801 | 1/1975 | Peters et al. | 356/121 |
| 3,904,274 | 9/1975 | Feinleib et al. | 350/161 |
| 3,923,400 | 12/1975 | Hardy | 356/107 |
| 3,975,629 | 8/1976 | O'Meara | 250/201 |
| 3,988,860 | 10/1976 | O'Meara | 250/201 |
| 4,141,652 | 2/1979 | Feinleib | 356/121 |

OTHER PUBLICATIONS

Schmutz et al., "Integrated Imaging Irradiance Sensor: a New Method fo Real-Time Wavefront Mensuration", *Proceedings of the Society of Photo-Optical Instrumentation Engineers* vol. 179, (Apr. 1979) pp. 76-80.

*Primary Examiner*—R. A. Rosenberger
*Attorney, Agent, or Firm*—Hamilton, Brook, Smith and Reynolds

[57] ABSTRACT

An improved light waveform image sensing system is described. The image wavefront is focused on an image divider and divided into "n"-segments ("n">1) whereupon the "n"-segements are focused on "n"-detector arrays and detected by "S"-detectors ("S">>1) in the "n"-detector arrays.

The "S"-detectors may comprise any of the well-known photosensitive elements. A particular useful detector is an electron-beam mode device described in detail herein. The detected signals are combined to produce an electrical signal proportional to the tilt in the wavefront which signal may be used to deform a deformable mirror thereby correcting the image.

35 Claims, 15 Drawing Figures

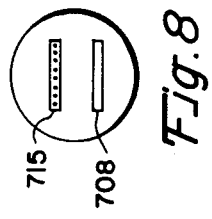
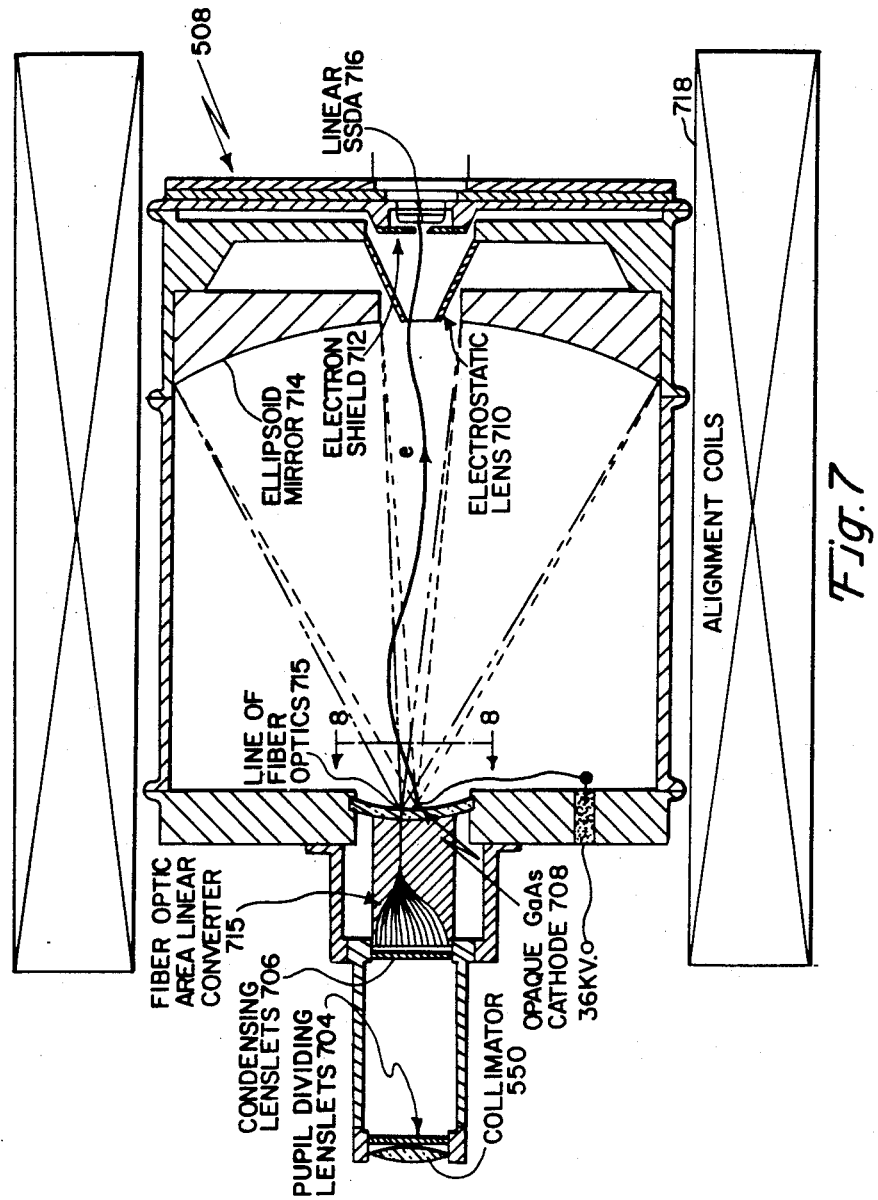

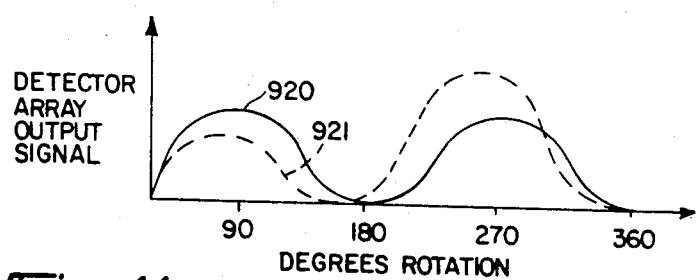
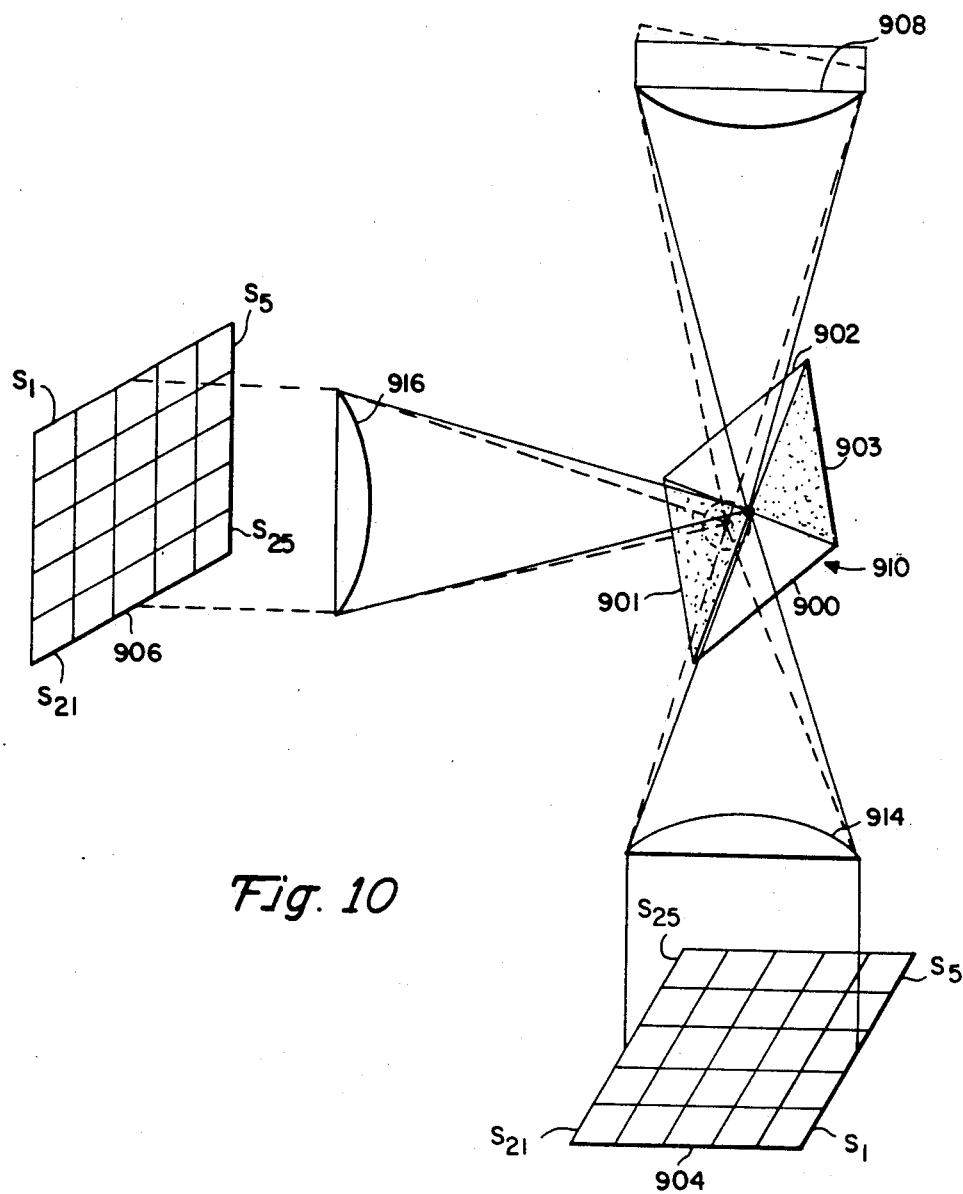
Fig. 11
Fig. 10

OPTICAL WAVEFRONT SENSING SYSTEM

DESCRIPTION

1. Technical Field

This invention is in the field of adaptive optics systems and more particularly relates to apparatus for sensing wavefront distortions in a beam of light.

2. Background Art

As discussed in U.S. Pat. No. 4,141,652, various adaptive optics systems have been devised to improve resolution by correcting for distortions induced in light wavefronts by atmospheric disturbances and the imperfections of the receiving optical systems. These adaptive optics systems are either outgoing wave modulated systems or return wavefront measurement systems. The apparatus of U.S. Pat. No. 4,141,652 relates to an improvement in the Hartmann-type sensors used in return wavefront measuring systems.

In the apparatus of U.S. Pat. No. 4,141,652, a modulated reference beam from a laser is combined with an incoming beam of light, the combined beam is then nutated to produce a detectable AC signal and divided into a plurality of beams of subaperture dividing components and is detected by an array of photodetector cells for measuring the position of both the focused incoming beam and the reference beam. The difference between the relative position of the incoming beam and the reference beam is indicative of the distortion in the system and is used to provide a signal to compensate for such distortion.

While the embodiments described in U.S. Pat. No. 4,141,652 constitute a significant unobvious advance over the state of the art at the time the invention was made; nevertheless, their use for large compensation systems involving 200 or more subapertures is limited in part by the cost and complexities involved in fabricating an accurate beam divider (such as a lenslet array) used to divide the beam into the large number of subapertures, and the need to provide a costly array of photodetectors configured to measure all the subaperture positions (such as an array of quad cells). The division of the beam by the large number of these lenslets increases the diffraction spread and greatly reduces the accuracy of measurement.

Thus, a need exists for an adaptive optics system which is suitable for use in large compensation systems to improve resolution and which is less complex and lower in cost than that described in U.S. Pat. No. 4,141,652.

DISCLOSURE OF THE INVENTION

This invention relates to sensor systems for detecting wavefront distortions in an incoming beam of light.

The apparatus of this invention includes means for emitting a modulated reference beam and means for combining the modulated reference beam with an incoming beam of light, such as light at the input pupil of a telescope which will be analyzed for wavefront distortion. The reference light beam may be, for example, a modulated laser beam having a plane or spherical wavefront. The combined beam is nutated in a circular fashion, for example, by a pair of sinusoidally driven resonant galvanometer mirrors locked in phase quadrature. The combined nutated beam is focused on the tip of an optical divider, such as an n-sided prism (where "n" may be any number greater than 1, and normally would be equal to four). The effect of the nutation is to move the beam in a circular pattern around the prism. The focussed image of the light source is thereby divided into n-reflected beams, by the prism, each reflected part is then projected onto a separate detector array located at a plane conjugate to the input pupil of the telescope. The detector arrays act as pupil dividers for each of the n-reflected beams dividing each of the "n" beams into "S" subapertures. The arrays will normally have many more sub-elements "S", than the number of beams "n" obtained from the image divider. The wavefront error in each of the "S" subapertures is detected by photosensitive means by the "n" arrays, each of which have "S" photodetectors. The wavefront error is detected by comparing the intensities of light in the "n" sets of detectors (one of the "S" detectors in each of the "n" arrays) corresponding to each subaperture. The "n" such detectors comprise a spot position sensor for one of the "S" subapertures.

The reference beam input wavefront can be envisioned as a set of ray bundles or tubes, one for each subaperture. Since this reference beam is considered perfect, all of the rays will converge at the same point on the pyramid. As the system is aligned then this point will fall on the tip of the pyramid and each ray bundle will be divided into "n" (four) equal parts and the set of detectors for the subaperture, one from each detector array, will have identical outputs. If the incoming wavefront is aberrated, the bundles of rays will not converge to the same point and will not be divided equally. The unequal division is sensed by detectors as variation of optical power and this provides a measurement of tilt of the subaperture bundle of rays. This tilt is the slope of the wavefront. The full wavefront surface is obtained by combining the slopes of each subaperture.

The fundamental difference between the present invention and that in U.S. Pat. No. 4,141,652 is relocation of where the pupil division and light division for subaperture wavefront tilt measurement takes place. In the present invention, the subaperture wavefront is divided for tilt measurement purposes by the "n"-sided prism before the pupil is divided into a multiplicity of "S" subapertures. In U.S. Pat. No. 4,141,652, the pupil division occurs first by an "S" element lenslet array or "S" faceted beam divider and then the subaperture wavefront is divided for tilt measurement at the "n" element detector such as a quad cell (where n=4). Consequently, in the 4,141,652 U.S. Pat. No. there must be an array of "S" quad cells. The complex problem of fabricating an array of "S" quad cells is avoided in the present invention and the diffraction spread at the measurement divider (the "n"-sided prism of the present invention) is determined by the full aperture and is greatly reduced as compared to the subaperture diffraction spread at the measurement quad cell of U.S. Pat. No. 4,141,652. Each of the "n" arrays in the present invention is made up of "S" individual photon sensitive elements in a simple geometry rather than the more complex array of "S" quad cells that would be required in U.S. Pat. No. 4,141,652.

While the above described preferred embodiment of the invention employs a reference beam to provide an optical and electronic self-calibration capability, it should be understood that in the simplest form such a feature is not mandatory. Similarly, nutation of the beam about the prism is not essential to the extent the beam could be precisely focused at the tip of the prism and the tip could be sufficiently precisely defined. The nutation allows various aspects of the focussed light spot at the tip of the prism to be measured. If the source of the light is a complex shaped object the image of which is focussed on the pyramid, then an average light spot position can be measured by the use of nutation.

By use of nutation, not only can the average spot position be measured for each subaperture, but the shape or form of the object can be determined from the variations with time in the electronic signal from the detectors. This can be very useful for tracking a particular feature of an object, such as a "hot spot", rather than the centroid of the object.

The use of nutation is also highly advantageous for infra-red light wavefront measurements where the photon detectors perform better as AC detectors and where the wanted light source can be measured in the presence of uniform unwanted background light.

On the other hand, when the light received is in the visible wavelengths or of short duration, the nutation can be stopped and a DC measurement, or instantaneous measurement of the spot position can be made. The DC measurement increases the sensitivity of the wavefront error detection but does not allow resolution of a complex source distribution to be obtained.

DESCRIPTION OF THE DRAWINGS

FIG. 7 is a sectional view of an electron beam mode detector array useful in the wavefront sensor of FIG. 5;

FIG. 8 is a sectional view along lines 8—8 of FIG. 7;

FIG. 10 is a diagram of an alternate embodiment of the invention which utilizes a reticular mask and requires only two detector arrays to produce a wavefront distortion sensing device;

FIG. 11 is a wavefront plot diagram showing the detector output signal for a distorted beam segment versus an undistorted beam segment;

BEST MODE OF CARRYING OUT THE INVENTION

The invention will now be further described in more detail by referring to the figures.

Figure 1:
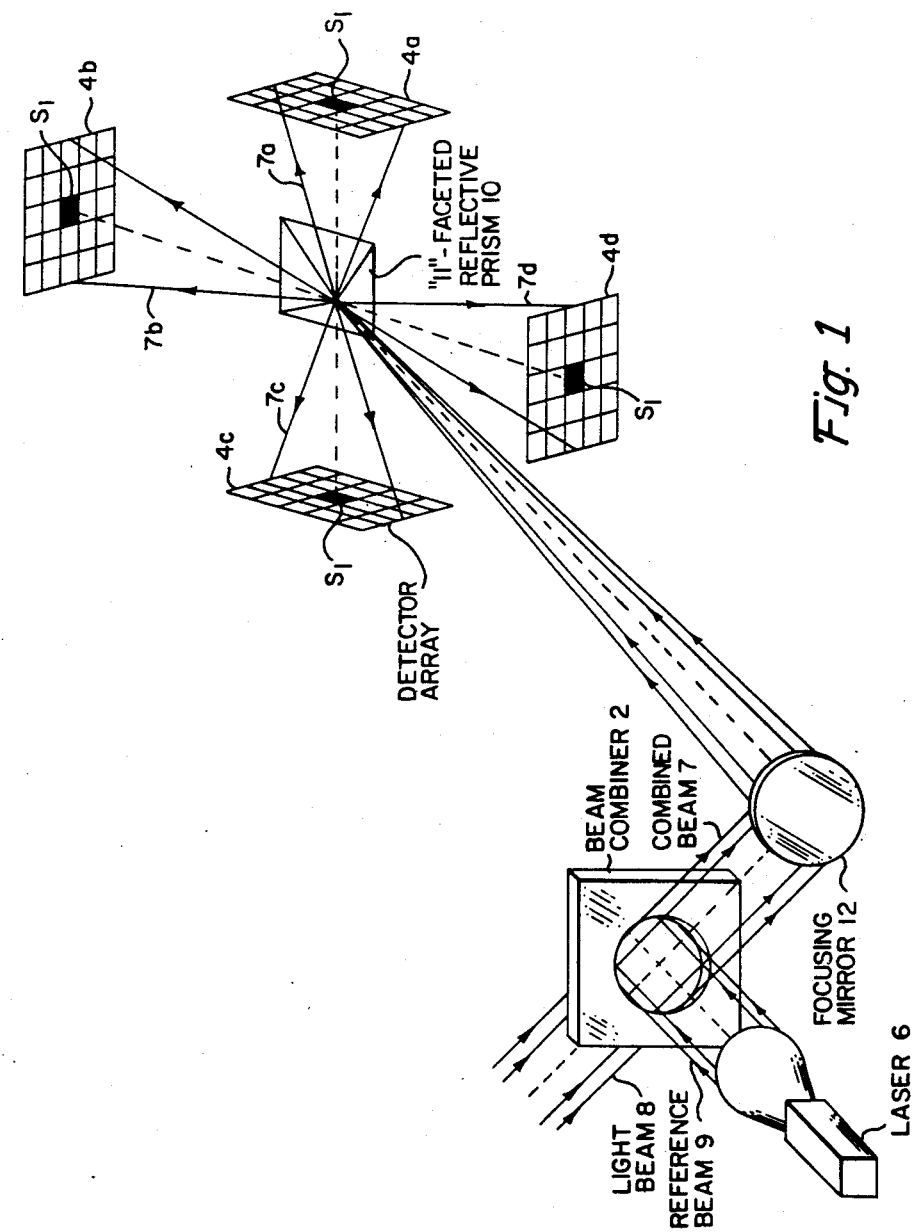
FIG 1 is a simplified perspective view of the optical components of an improved wavefront sensor according to this invention.
Figure 2:
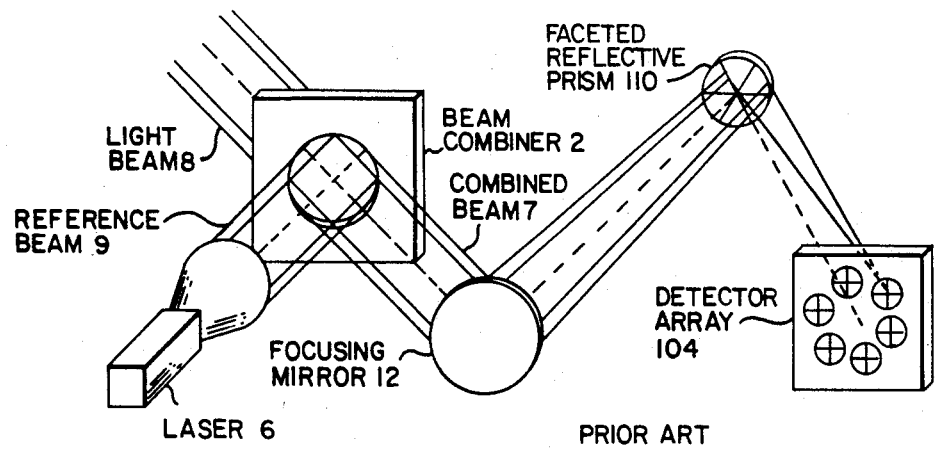
FIG. 2 is a perspective view of the prior art as represented by FIG. 6 of U.S. Pat. No. 4,141,652.
Figure 6:
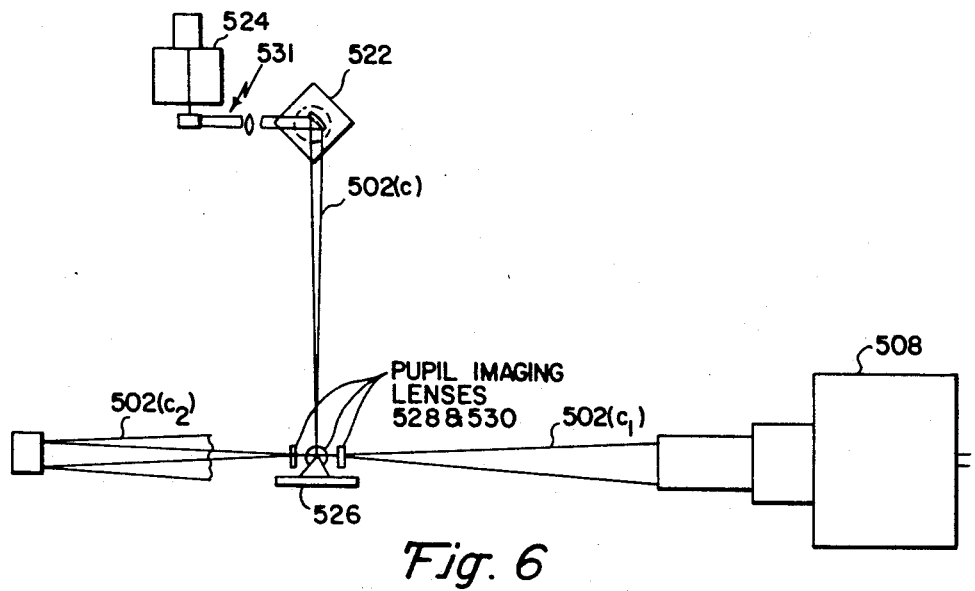
FIG. 6 is a schematic diagram of a portion of the wavefront sensor system.

FIG. 1 is a simplified perspective of an embodiment of the optical apparatus of the invention which is purposely drawn to show the similarities and differences between the present invention and the perspective view of FIG. 2 which represents the prior art embodiment of FIG. 6 in U.S. Pat. No. 4,141,652. Note that like elements are correspondingly numbered in FIGS. 1 and 2.

In FIG. 1, a light beam entering the optical system, for example, the light entering the pupil of a telescope, is designated by the arrows 8. This beam 8 is combined in beam combiner 2 with a reference light beam 9 from laser 6. The light beam may be a wavefront of light originating from a distant object, for example, a satellite or star, or may be light reflected from an object illuminated by a source located in proximity to the apparatus of FIG. 1. In this latter case, the light wave is designated the "return beam". The reference beam 9 is preferably an amplitude modulated plane or spherical wavefront emitted by a laser source modulated by an acousto-optical modulator (not shown), or a modulatable laser diode. Suitable laser sources may comprise continuous wave or pulsed single mode gas lasers or lasers with pinhole spatial filtering. Beam combiner 2 may comprise a well-known beam splitter for combining two or more beams of light.

The combined beam 7 from beam combiner 2 is directed to focusing mirror 12 where it is reflected towards prism 10 and focused so that the combined beam converges or is focused at the tip of the "n" faceted reflective prism 10. The light beam 7 which impinges at the top of faceted prism 10 is divided into "n" (in this case, 4) substantially identical combined beams 7a, b, c, and d, and redirected in 4 orthogonal paths. These 4 beams impinge on 4 separate detector arrays 4a, b, c and d which are located in a plane conjugate to the input pupil of the telescope.

Each of the detector arrays comprise a plurality of detector elements "S", having at least one detector element per subaperture. Typical detector elements are photosensitive devices such as photomultipliers, photosensitive charge coupled diodes or photodiodes.

Figure 3:
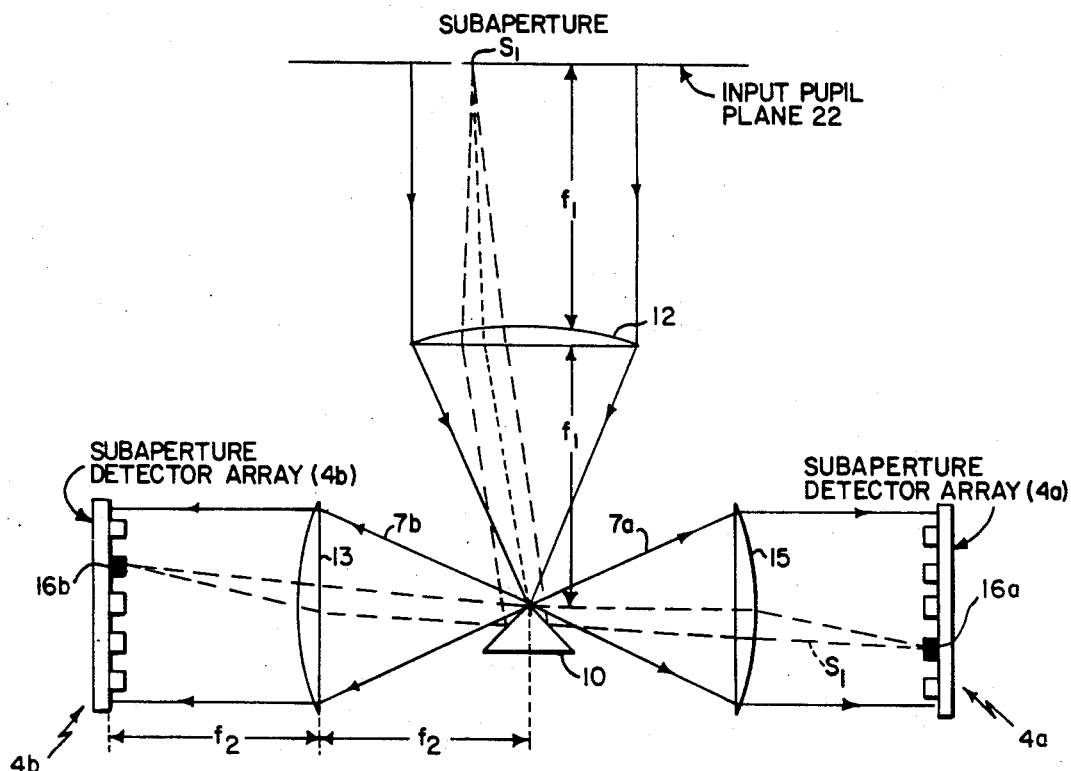
FIG. 3 is a schematic light ray diagram illustrating the path of one subaperture of the wavefront from the input pupil plane to two detector arrays.

As can be seen more clearly in FIG. 3, each detector array, 4a–d acts as a subaperture mask dividing each of the 4 beams into "S" subapertures. In other words, by projecting the detector array pattern back through the optical system, it can be seen that each detector element maps into a subaperture of the input pupil of the telescope. For simplification, only two of the detector arrays 4a and 4b of FIG. 1 are shown in FIG. 3 in one dimension. Also collimating lenses 15 and 13 for each respective divided beam 7a and 7b are shown in FIG. 3.

In the apparatus of FIG. 3 the input pupil plane 22 represents the wavefront at the telescope input pupil of the light from the desired target or source for which the wavefront distortion is being measured. In order to focus the image of the desired target at the top of the prism, the focusing element 12 (shown for simplification here as simple lens) is located a distance $F_1$ (corresponding to the focal length of lens 12) from the top of prism 10 and also at the same distance $F_1$ from the input pupil plane of the telescope. Similarly, collimating lens 15 (as well as lens 13) is located a distance $F_2$ (corresponding to the focal length of the lens 15) from the plane of detector array 4a and the tip of prism 10.

Thus, it may be seen that a subaperture segment $S_1$ of combined beam 7a impinges on detector 16(a) of array 4(a). The light rays from segment $S_1$ can be traced back to the focusing lens 12 as shown in FIG. 3 and thence to a subaperture $S_1$ of input pupil plane 22.

A similar segment S₁ of combined beam 7b impinges on detector 16(b) of detector array 4b. The light rays from segment S₁ of array 4b can also be traced back through prism 10 to subaperture S₁ of input pupil plane 22.

Figure 4A:
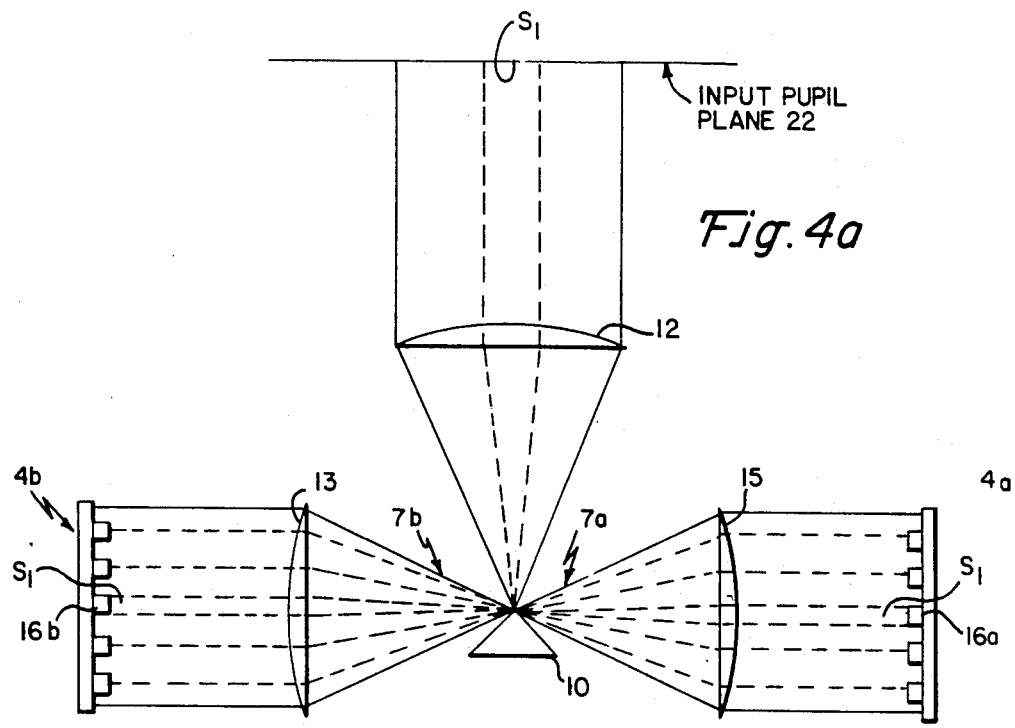
FIGS. 4(a) and 4(b) is a schematic light ray diagram illustrating the path of undistorted light [FIG. 4(a)] versus distorted light [FIG. 4(b)] from one subaperture of the input pupil plane.
Figure 4B:
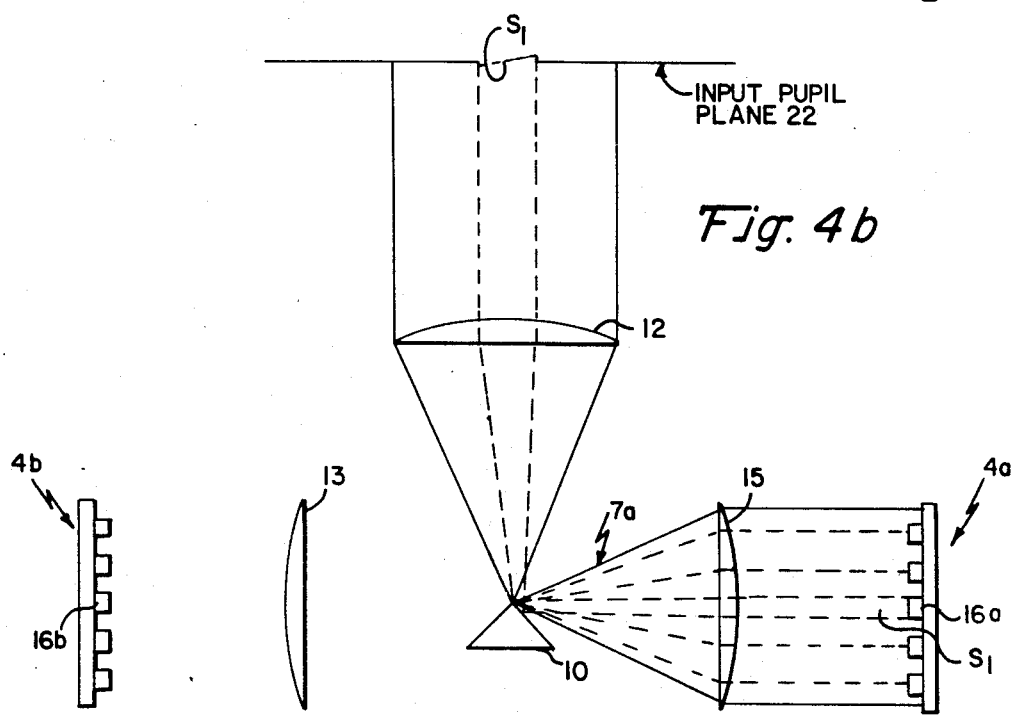

In order to understand how wavefront tilt, which is proportional to the distortion of the return beam, is measured, it will be helpful to consider FIGS. 4a and b which are simplified versions of the beam path of one segment of light rays from an undistorted beam (FIG. 4a) such as reference beam 9 and a distorted (tilted) beam (FIG. 4b). A segment of undistorted light, for example, from beam 9 of FIG. 1, such as from subaperture S₁ located at the input pupil plane 22 will impinge on the central detector 16a of array 4a and also on the central detector 16b of array 4b. The intensity of light on detector 16a will equal the intensity on 16b, as would be expected if there is no tilt in the input subaperture wavefront at subaperture S₁.

FIG. 4b shows what happens when the wavefront from the beam is tilted or distorted. The image from subaperture S₁ is shifted at the plane of the prism 10. As a result, more light from subaperture S₁ will be sensed by detector 16a than detector 16b. The difference in intensity detected is proportional to the tilt of the wavefront or subaperture S₁.

For each subaperture the wavefront error is measured by comparing the light intensity of the "n" detectors corresponding to that subaperture. There is one detector in each "n" detector array that corresponds to a particular subaperture.

Referring now to FIG. 2, the improvement of the invention thus described over the prior art, represented by FIG. 2, may be appreciated. The optical system, up to the point where the combined beam 7 is focused from mirror 12, is substantially identical in FIGS. 1 and 2 and the description will not be repeated here. The point of departure occurs in FIG. 2 where the combined beam instead of being focused at the tip of prism 10, as in FIG. 1, is not focused but is directed to impinge on all sides of reflective prism 110 which divides the light beam into separate beams (in FIG. 2 six separate beams) each reflected beam coming to a focus on respective detectors (quad cells) in a single array 104. The fact that each beam comes to focus on an individual detector after being divided by prism 110 means that the focused beam is spread by diffraction because the aperture of that beam is smaller than the full pupil aperture. This diffraction spread increases as the pupil is divided into many subapertures, for example, 200. The accuracy of tilt measured is inversely proportional to the size of the focused spot so that the larger the diffraction spread the lower the accuracy of the measurement.

On the other hand, as shown in FIG. 1, no matter how many subaperture elements are required, the combined beam need only be focused at one point, that is, the tip of prism 10, and the combined beam is focused from the full aperture input to the system before there is any subaperture division. The diffraction spread is therefore much less so that the tilt measurement becomes much more accurate. A concomitant benefit of the apparatus of this invention is that the detector elements do not have to be clumped together as quad cells, but may be disposed in a uniformly spaced planar array which is much more susceptible to large scale integrated circuit manufacturing techniques. Some of these arrays allow much of the electronic signal processing to take place on the detector array itself (such as charge coupled devices (CCD) or self-scanned diode arrays). This detector array processing can greatly reduce cost and complexity of wavefront measurement apparatus.

Another way of comparing the present invention with the apparatus of FIG. 2 is that in FIG. 1 tilt measurement of the entire wavefront is provided by a single "n"-sided (usually 4) optical divider and the wavefront is then divided into many subapertures "S". The detection for each subaperture is made by "n" (usually 4) detector elements for each subaperture; whereas in FIG. 2 the wavefront is first divided into "S" subapertures by an optical divider and the tilt of each subaperture segment of the wavefront is measured by "S" detectors where each detector has an "n"-element configuration (usually "n" is 4 and the detector is a quad cell configuration).

Figure 5:
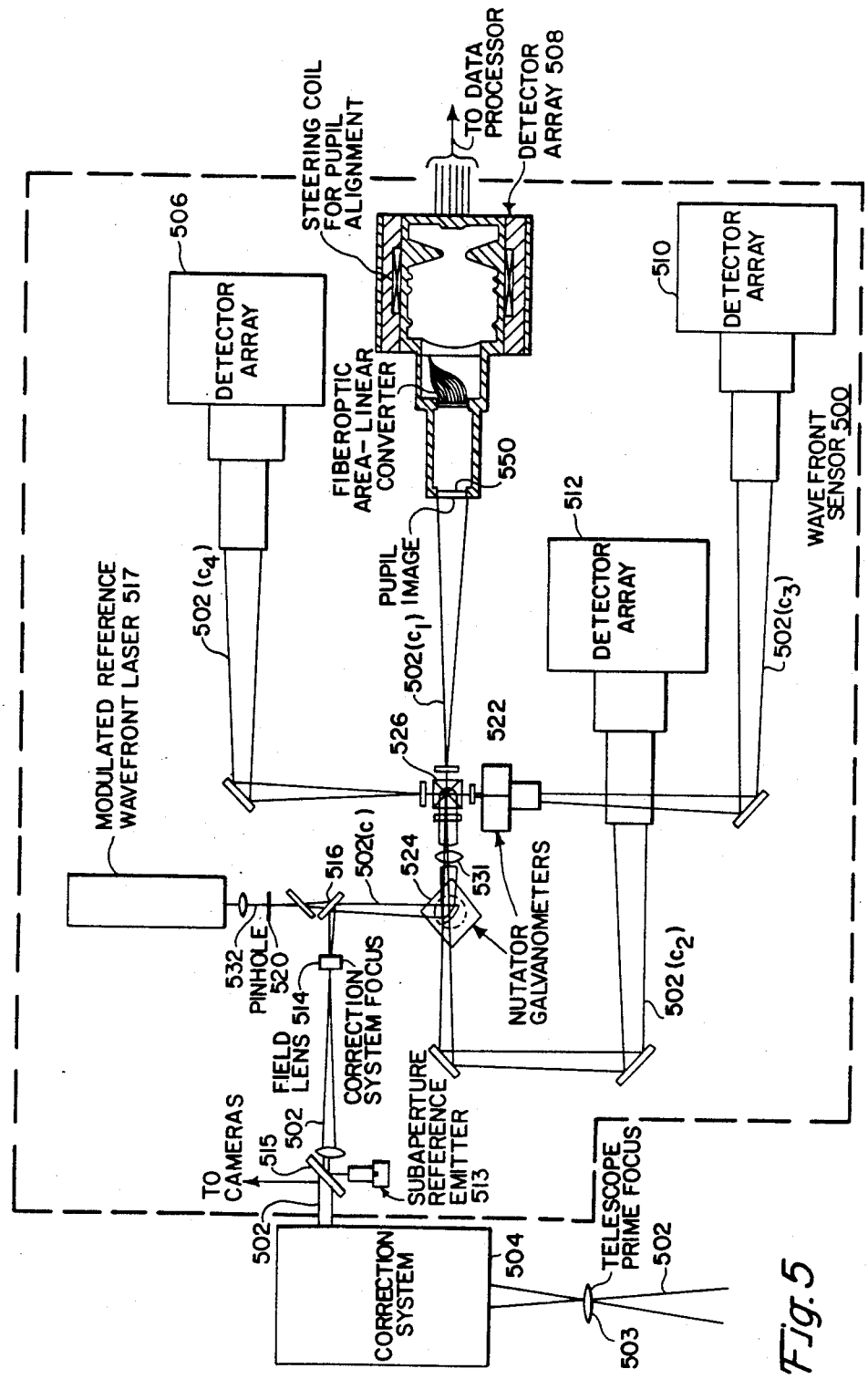
FIG. 5 is a detailed schematic diagram of a wavefront sensor system in accordance with the invention.

Referring now to FIGS. 5 and 6, further details of wavefront sensor previously generally described in connection with FIGS. 1, 3 and 4 may be illustrated. In the block diagram of FIG. 5, the optics of the wavefront sensor 500 are shown within the dotted lines. The incoming beam 502 is brought to focus by a telescope (not shown) at lens 503 from where it diverges and is collimated in correction system 504 which will be described in connection with FIG. 9. In addition to the collimator, correction system 504 includes a tip/tilt corrector and a deformable mirror such as shown in U.S. Pat. No. 3,904,274 issued Sept. 9, 1975 and entitled "Monolithic Piezoelectric Wavefront Phase Modulator" to Julius Feinleib, et al. The beam 502 is refocused from the deformable mirror into the wavefront sensor 500 and is also transmitted to cameras (not shown).

The correction system 504 is in the control loop of the wavefront sensor so that the beam sent to the cameras (arrow C) and into the wavefront sensor has been corrected and contains only the residual wavefront errors from the previous measurements and new errors that are being measured. Thus, the beam sent to the cameras forms a corrected image of the targets in the field of the telescope. This corrected image may be recorded by the cameras or viewed or used in a tracking system (as may be required).

Before the beam 502 is brought to focus, however, the central subapertures of the beam, which are occluded by the telescope secondary lens, are identified by introducing a beam through a centrally located prism 515 from a subaperture reference emitter (SRE) 513. The beam signal from SRE 513 is used to provide alignment of the four detector arrays 506, 508, 510 and 512. The electronic adjustment available from the modulated subaperture reference emitter is used to compensate for the small changes in the position of the detector arrays caused by mechanical relaxation, etc., which can be significant even if they are only a few microns in error.

Following the reference subaperture input, a field lens 514 is provided in the path of beam 502. Field lens 514 is located at the correction system focus and serves to image the deformable mirror in the correction system or the system pupil on to the nutator galvanometer. The deformable mirror in the correction system 504 is located at the pupil image plane.

Beam 502 next impinges on reflective beam splitter 516 where the reference beam 532 is introduced and combined with the incoming beam 502. Reference beam 532 is provided by a modulated reference wavefront laser 517. The laser beam from laser 517 is focused on pinhole 520 located close to beam splitter 516. The reference beam is then located and defined by the pinhole from which a perfect spherical wavefront will emerge. Thus, the uncompensatible non-common path between beams 532 and 502 is relatively small and the stability of the system is assured.

The reference beam 532 provides a means for determining the perfection of alignment of all of the optical elements from the point at which the incoming beam of light and the reference beam are combined to the point at which they are both focused on the tip of the optical divider 526. For correct operation, the reference beam 532 should be positioned exactly at the center or tip of the divider 526; if it is not so positioned an imbalance in the output signals among the "n" sets of detectors occurs and is used to generate an error signal. The error signal so generated is used to change the position or orientation of an optical component to compensate for any inaccuracies in the reference spot position. For example, the error signal may be applied to the resonant galvanometer mirror in addition to the sinusoidal drives with the result that the reference beam spot will always be maintained at the center of the optical divider 526. Because the optical path of the reference beam and signal beam are exactly correct, alignment of the incoming beam is thus maintained. This technique is very advantageous in the reduction of the effects of temperature changes on optical alignment. The reflecting beam 502(c) which emanates from the beam splitter 516 proceeds to the nutator galvanometers 522 and 524 and relay lens 531 and is then focused at the tip of an "n"-faceted pyramid 526.

The pyramid 526 is a critical element because its edges must be sharp. The radius at an edge must be substantially sharp so that a fine point is made at the intersection of the edges. Such an edge may be obtained by diamond machining and the use of cleaved crystals. A large number of tetragonal system crystals provide natural pyramid corners. Among these are the holosymmetric class, which yield some four-faceted corners and include rutile, anatase, zircon and others.

The four beams reflected from the faces of the pyramid are labeled $502(C_1)$, $502(C_2)$, $502(C_3)$ and $502(C_4)$. The direction of the paths of these reflected beams will depend on the crystal configuration. In any event, a pupil imaging field lens is placed in the path of each beam to form an image on the input to the pupil divider optical system of the detector arrays. Two of these pupil imaging lenses, 528 and 530, are associated with respective reflected beams ($502(C_2)$ and $502(C_1)$), respectively, as can be seen more clearly in FIG. 6 (which is a partial diagrammatical side view of the apparatus of FIG. 5) showing that the nutated beam 502(c) from the galvanometers is reflected downward on the tip of pyramid 526.

The pupil imaging lenses 528 and 530 serve to form the image from the pyramid on to the input pupil of the optics of each detector array optical system.

The first element in the detector array optical system is a simple achromatic lens which is used to collimate the principal rays from each beam. This lens is shown at 550 for detector array 508 in FIG. 5. It should be understood that each of the detector arrays, 506, 508, 510 and 512 are substantially identical so it will suffice to describe the apparatus of detector array 508 as follows in connection with FIG. 7.

The detector array 508 of FIG. 7 is an electron beam bombardment mode detector. It should be understood, however, that other types of detector arrays may be substituted therefore without detracting from the intent or scope of the invention. In the apparatus of FIG. 7 one of the light beams reflected from the "n" faceted prism 526 impinges on collimator lens 550 and is collimated and then impinges on an array of pupil dividing lenslets 704. Each lens in a lenslet focuses the light impinging on it to a corresponding lens in a second array of pupil dividing lenslets 706 which are focused on individual fibers in the bundle of fiber optics 715.

The fiber optics bundle converts the area beam impinging on the lenslets 706 to a linear beam. The light from the fiber optics bundle is collected by ellipsoidal mirror 714 and re-focused onto an opaque gallium arsenide cathode 708 located adjacent the linear fiber optic bundle (as can be seen in FIG. 8). Gallium aresnide cathode 708 is held at a minus voltage potential of 35 kilo-volts obtained from a voltage source (not shown). The light beam from the mirror 714 impinging on the opaque gallium arsenide cathode causes photo electrons "e" to be emitted. These photo electrons are accelerated and focused by the electrostatic lens 710 on linear self-scanned diode array (SSDA) 716 which acts as the anode of the electron beam tube. The linear self-scan diode array consists of an array of p-n junctions forming an array of diodes each of which is protected by a layer of silicon dioxide. A separate metal shield 712 is placed above the array to protect the interconnections in the array from electron bombardment. The linear self-scanning detector array converts the photo electrons which have been amplified by electron beam acceleration into an electrical signal which is proportional to the original intensity of light entering a fiber of the fiber optic bundle.

Alignment coils 718 are provided about the longitudinal periphery of detector array 508 to electrically align the electron beam with the SSDA 716.

This alignment is obtained by using the four control subapertures which are normally obscured in an astronomical telescope. As previously mentioned in connection with FIG. 5, a reference emitter 513, such as, a light emitting diode lamp, which can be pulsed, generates a reference beam in the center of the obscured area in such a way that the four subapertures in the detector array which are in the center of the array will receive the same signal if the subaperture array is correctly aligned. If there are any imbalances in the subaperture detector output signals, indicating a misalignment, the current in the aligning coils 718 is adjusted to correct this imbalance and thus align the subaperture detector array.

The output of the SSDA detector 716 in each array is therefore an analog electrical signal representing the instantaneous intensity of light impinging on the detector from the divider.

In order to understand how tip and tilt correction signals are generated from this signal and processed in accordance with the above described system, it will be useful to consider how the signal is affected by the shape and intensity of the target image and other factors. For this purpose, reference is made to FIG. 12 in which an object image 1200 is shown on a quad detector or 4-sided pyramid divider 1210 divided into quadrants I-IV. The object image is shown as a square of width W with uniform brightness, since the analysis provides a simple algebraic result. The centroid of the image 1200 is located at a point x' and y' from the center of the divider 1200, where x' is a function of the alignment displacement and x component of the nutation displacement, or in mathematical terms:

$$x' = \Delta x + \rho \cos \theta \quad \text{Equation 1}$$

and similarly $$y' = \Delta y + \rho \sin \theta \quad \text{Equation 2}$$

wherein
$\Delta x$ = the subaperture wavefront tilt to be measured in the x direction
$\Delta y$ = the subaperture wavefront tilt to be measured in the y direction
$\rho$ = radius of nutation
$\theta$ = angle of nutation about $\Delta x$ and $\Delta y$.

Figure 12:
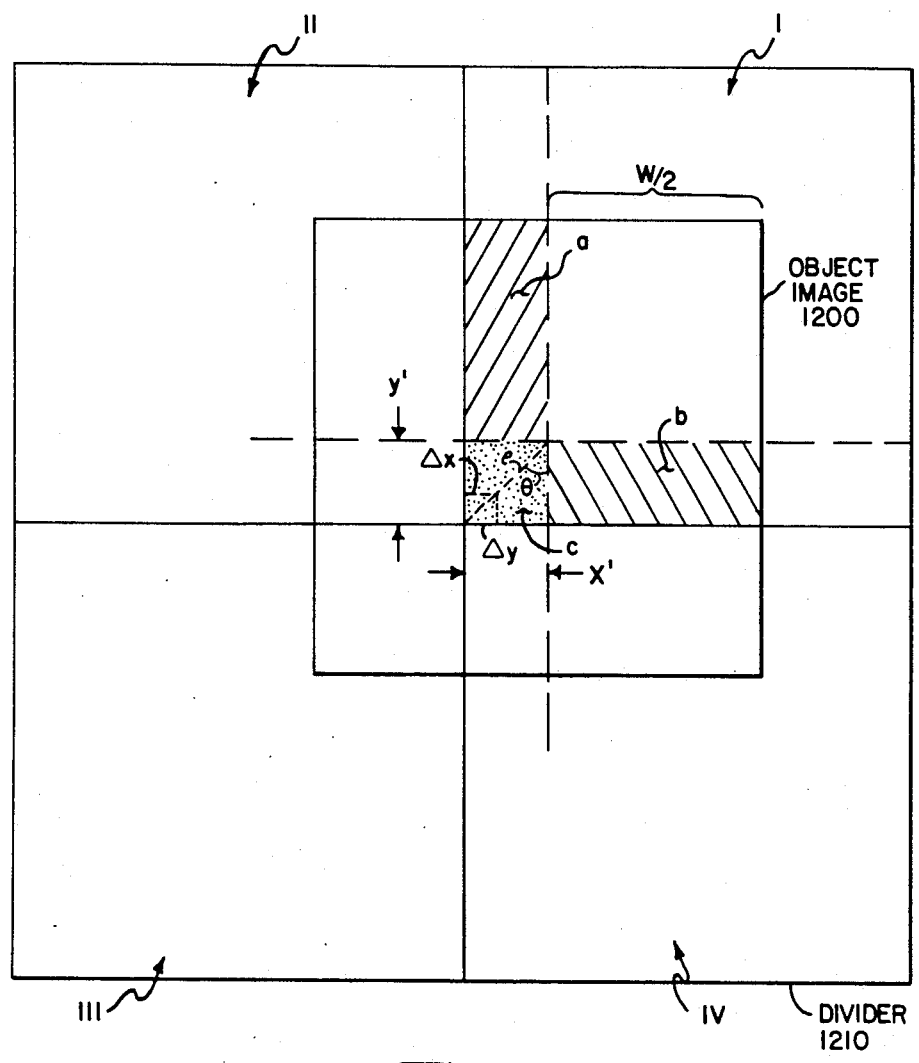
FIG. 12 is a diagram illustrating the parameters contributing to the signal at the detectors for a specific image object.

The processing of the outputs of the detectors in each array to obtain a measurement of displacement consists of correlating each detector output with a nutation dependent weighting function, and dividing the correlated sum of detectors with a power dependent correlated sum. This can be mathematically expressed as:

$$\Delta x = \frac{\sum_1^N \int_0^{2\pi/\tau} I_n(t) \Delta_{nx}(t) dt}{\sum_1^N \int_0^{2\pi/\tau} I_n(t) P_{nx}(t) dt} \quad \text{Equation 3}$$

where $I_n$ are the detector output signal currents of each n detector array and $\Delta_{nx}(t)$ is the weighting function for a $\Delta x$ measurement, and $P_{nx}$ is the power term for a $\Delta x$ measurement. The signal currents are proportional to the areas of the object image 1200 in the quadrant of the divider at any given time, as follows:

$$i_I = K(A/4 + a + b + c) \quad \text{Equation 4}$$
$$i_{II} = K(A/4 - a + b - c)$$
$$i_{III} = K(A/4 - a - b + c)$$
$$i_{IV} = K(A/4 + a - b - c)$$

where K is a constant dependent on light to the detector and the detector sensitivity, A is the total area of the object image, and a, b, and c are the respective areas of the object indicated by the shaded areas a, b, and c of FIG. 12 and $i_I$ is the current from quadrant I of the divider.

From a geometric analysis of FIG. 12, it can be shown that area c is equal to:

$$(\Delta x + \rho \cos \theta)(\Delta y + \rho \sin \theta) \quad \text{Equation 5}$$

The outputs of the cells can be added together in various ways. For example simply adding the signal current output from all cells yields:

$$i_I + i_{II} + i_{III} + i_{IV} = KA \quad \text{Equation 6}$$

which is indicative of the total power.
Another possible combination is:

$$i_I + i_{II} - i_{III} - i_{IV} = K(4b) \quad \text{Equation 7}$$

and yet another is:

$$i_I - i_{II} - i_{III} + i_{IV} = K(4a) \quad \text{Equation 8}$$

It should be noted that the combinations defined in Equations 7 and 8 are sensitive to displacements $\Delta x$ and $\Delta y$ respectively if integrated over a full nutation cycle, since $4a = 2W(\Delta x + \rho \cos \theta)$ and $4b = 2W(\Delta y + \rho \sin \theta)$.

The weighting functions $\Delta nx^{(i)}$ for Equation 7 is 1, 1, $-1$, $-1$, and for Equation 8 is 1, $-1$, $-1$, 1 respectively, and is independent of frequency and nutation radius.

Another way of combining the outputs of the detector arrays is the sum:

$$i_I - i_{II} + i_{III} - i_{IV} = K(4c) \quad \text{Equation 9}$$

This sum will be zero if integrated over a full cycle, since $$4c = \Delta x \rho \sin \theta + \Delta y \rho \cos \theta + \rho^2 \sin \theta \cos \theta \quad \text{Equation 10}.$$

If Equation 9 is cross correlated with $\sin \theta$ or $\cos \theta$ over a full cycle, however, the results will be respectively:

$$\tau \Delta \rho K \text{ and } \tau \Delta y \rho K$$

The displacements $\Delta x$ and $\Delta y$ are modulated by the quadrature terms $\sin \theta$ and $\cos \theta$, where $\theta = \omega t$ in Equation 9. Since the data is obtained at the nutation frequency $\omega$, this last sum represented by Equation 9 is an AC measurement and is useful when operating in the infrared where it is necessary to eliminate the effect of the large and constant thermal background present, which background signal when demodulated is reduced to a DC signal and can therefore be discriminated out.

The weighting functions to be applied to each detector signal for each of the quadrant detectors to provide displacement and power terms is as follows:

| | Equation 11 | |
|---|---|---|
| | for $\Delta x$ | for $\Delta y$ |
| $\Delta_{Ix,y}(t) =$ | $1 + \sin \omega t$ | $1 + \cos \omega t$ |
| $\Delta_{IIx,y}(t) =$ | $-1 - \sin \omega t$ | $1 - \cos \omega t$ |
| $\Delta'_{IIIx,y}(t) =$ | $-1 + \sin \omega t$ | $-1 + \cos \omega t$ |
| $\Delta_{IVx,y}(t) =$ | $1 - \sin \omega t$ | $-1 - \cos \omega t$ |
| $P_{Ix,y}(t) =$ | $1 + \sin \omega t$ | $1 + \cos \omega t$ |
| $P_{IIx,y}(t) =$ | $1 + \sin \omega t$ | $1 - \cos \omega t$ |
| $P_{IIIx,y}(t) =$ | $1 - \sin \omega t$ | $1 - \cos \omega t$ |
| $P_{IVx,y}(t) =$ | $1 - \sin \omega t$ | $1 + \cos \omega t$. |

In the case of the integrating self-scanned diode arrays, only a few samples can be taken each cycle and the correlations by $\sin \omega t$ or $\cos \omega t$ must be replaced by the integral of $\sin \omega t$ or $\cos \omega t$ so that:

$$x,y = \frac{\Sigma \int I_n(\omega t) INT[\Delta_{nx,y}(\omega t)] d\omega t}{\Sigma \int I_n(\omega t) INT[P_{nx,y}(\omega t)] d\omega t} \quad \text{Equation 12}$$

Equations 11 and 12 thus define a preferred factor to be applied to the signals from the detectors in order to optimize the wavefront sensing system for a particular object image. The data processor for accomplishing this will now be described in general. However, the particular details of the data processing functions described are well known in the literature and will not be described in depth herein to avoid undue repetition.

Figure 13:
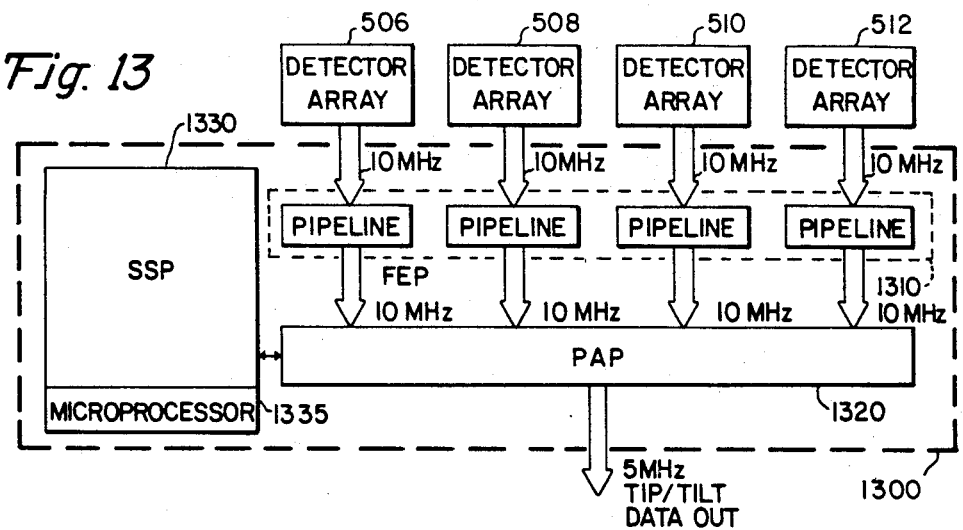
FIG. 13 is a block diagram of a data processor used in processing the signals from the detector arrays.

Referring now to FIG. 13, an electronic data processor 1300 is shown which is intended to minimize operator intervention. There are three major subassemblies in the electronic processor 1300. These are the front end processor (FEP) 1310, the programmable algorithm processor (PAP) 1320, and the system supervisor processor (SSP) 1330.

The input to the data processor 1300 consists of the electrical signals from each of the 4 detector arrays shown as 506, 508, 510, and 512 in FIG. 5. FEP 1310 in the data processor digitizes, normalizes and buffers these detected signals. Since the electrical signals from the SSDA (such as in FIG. 7) are generated in serial rather than parallel form, they can be readily processed in serial in a so-called pipeline data processor shown in FIG. 14 which shows one channel 1410 of the FEP 1310.

Figure 14:
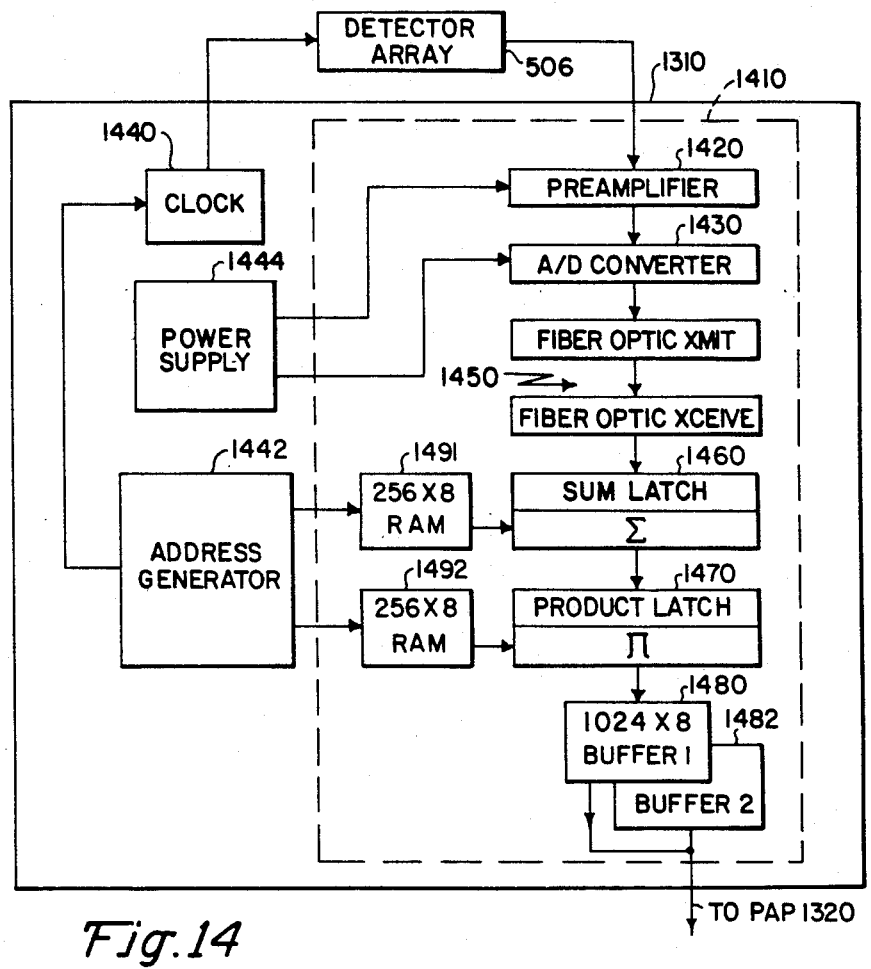
FIG. 14 is a schematic diagram of a front end processor used in the data processor of FIG. 13.

As shown in FIG. 14, each SSDA 506 is coupled to a preamplifier 1420 and an analog-to-digital (A/D) converter unit 1430. Together these devices digitize the subaperture data from array 506 to 8 bits accuracy at a 10 MHz subaperture data rate controlled by clock 1440. A fiber optics transceiver 1450 couples the digitized data to a sum latch circuit 1460 and product latch circuit 1470.

Circuits 1460 and 1470 are also coupled to respective random access memory (RAM) circuits 1491 and 1492 each having a 256 byte memory. The dark signal for each photodiode in the array 506 is stored in a separate memory location in RAM 1491. Similarly, the normalizing factor for each photodiode is determined and stored in RAM 1492. The dark signal and normalizing factor are applied against the digitized signal from transceiver 1450 in the sum latch circuit 1460 and product latch circuit 1470 and then fed to a pair of buffers 1480 and 1482 each having a 1024 byte memory and therefore capable of storing 4 samples per nutation cycle per 256 photodiodes. While one of the buffer circuits accepts the 8 bit output of latch 1470 for storage the other buffer is supplying data from the previous nutation cycle to the PAP 1320 (FIG. 13).

The data B(i,k) entering the buffer memory is equal to:

$$R(i) \times (P(i,k) - D(i)) \qquad \text{Equation 12.}$$

where P(i,k) is the digitized output of the ith detector during the kth time sample, D(i) is the ith dark signal value and R(i) is the ith responsivity correction constant.

Data moves from one stage of the FEP 1310 to the next at 100 nS intervals determined by the clock pulses from clock 1440. Hence each photodiode output is amplified, digitized, and normalized 600 ns after readout.

The FEP pipeline is four bytes wide, i.e., one byte for each detector array 506, 508, 510 and 512. All four data bytes are processed simultaneously and synchronously; thus a single RAM address generator 1442 and a single SSDA clock generator 1440 are adequate for all four detector arrays. Power supply 1444 supplies appropriate electrical power to the circuits in the well known manner.

The digitized photodiode signals must be processed in order to extract the subaperture tip/tilt information. As previously noted, there exist various algorithms for extracting this information, but all algorithms are similar in that they involve linear combinations of the 16 detected signals (four detectors per subaperture and four time samples per detector) followed by two ratio computations. The ratio computation (division) normalizes the tip/tilt measurement and hence the final tip/tilt value is independent of optical power. Data processing circuits for producing these functions are well known in the art and will not be described here.

Suffice it to say that the programmable algorithm processor (PAP) 1320 is designed to implement any subaperture signal processing algorithm for which the output signals are a linear combination of the input signals. The input signals to PAP 1320 are four 10 MHz signals from the buffers in FEP 1310 as previously noted.

The heart of the PAP is a four-bit expandable microprocessor (not shown). The microprocessor is an integrated circuit containing storage locations and an arithmetic logic unit (ALU). The PAP 1320 modifies the output signals from the FEP in accordance with a desired algorithm stored in the microprocessor. For example, the algorithm of Equation 12.

The SSP 1330 as shown in FIG. 13 supplies general purpose intelligence to the data processor 1300. The heart of the SSP 1330 is a commercial microprocessor 1335. The SSP controls the processor initialization, self test, calibration, nutator mirrors, dynamic subaperture alignment, and autolock.

When the sensor is first turned on, the SSP downloads the microcode to the PAP 1320 and downloads the calibration constants to the FEP 1310. This control information is used to self test the processor functions. The subaperture reference LED 513 (FIG. 5) is pulsed and all detector system elements (thermoelectric cooler, magnetic focus, solid state line scanner, preamplifiers, and A/D converters) are verified operational by the microprocessor.

The SSP 1330 verifies the functionality of the PAP 1320 by applying arbitrary subaperture signals to the input bus and examining the PAP outputs.

If desired, a detector calibration can be initiated. This calibration will use the internal reference LED as an optical source to calculate dark signal and responsivity for each cell of the four detector arrays. The new calibration constants will then be sent to the FEP. A full calibration requires approximately five minutes.

When the system is fully operational and begins supplying subaperture tilt data, the FEP 1310 and PAP 1320 are totally occupied in this task, however, the SSP 1330 continues to monitor the subaperture reference LED signals and maintains the subaperture alignment by applying signals to the magnetic deflection elements in the detector arrays.

The SSP 1330 also monitors and controls the nutation mirrors. The nutation radius can be varied to optimize the signal to noise ratio. It is also possible to use different amplitudes on x and y nutators for independent optimization. Since the SSP controls the PAP microcode, any tip/tilt scale changes to dynamic nutation control are easily and automatically removed by the microcoded processor elements.

Figure 9:
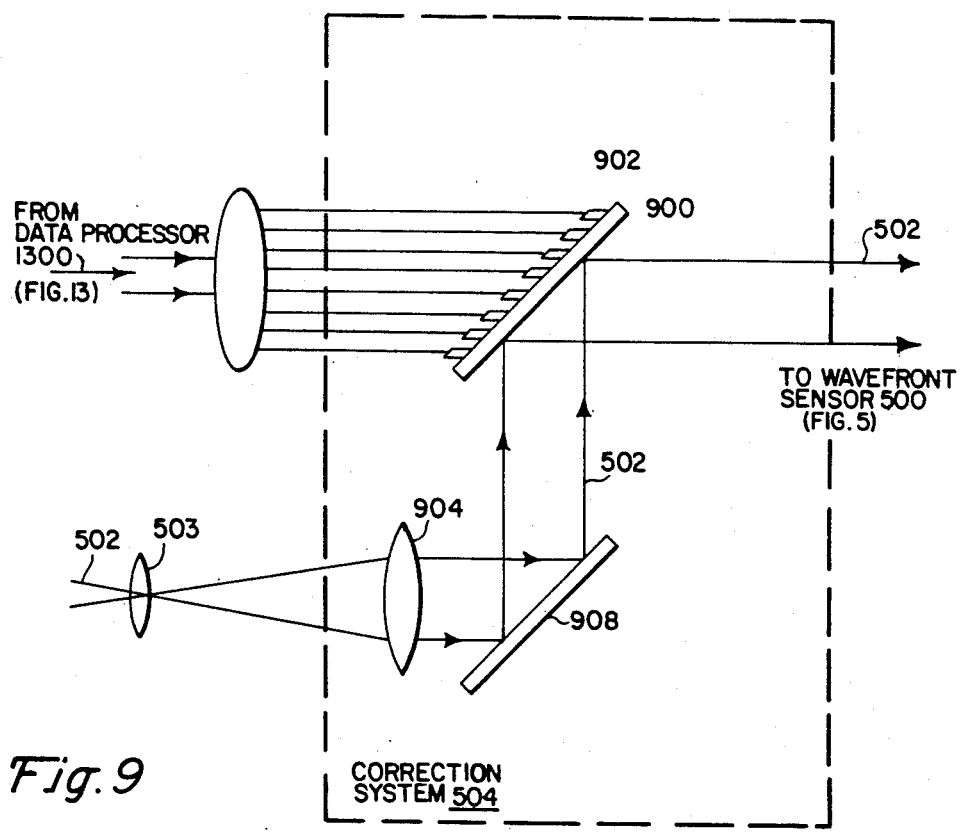
FIG. 9 is a schematic diagram of the correction system 504 of FIG. 5.

The output signals from PAP 1320 in data processor 1300 are coupled to the correction system shown in FIG. 9 in block diagram form. Signals from each subaperture detector provide the input signals to a mirror 900 having an array of piezoelectric elements 902 which function to selectively deform the mirror to correct phase distortions in the wavefront of incoming beam 502. The mirror 900 and elements 902 thus form a wavefront correction device as described in U.S. Pat. No. 3,923,400. The incoming beam 502 is focused on lens 503, is collimated in correction system 504 by lens 904, and projected onto tip/tit corrector 908. Corrector 908 consists of a movable mirror which may be manually or automatically moved to correct average tip/tilt error.

The beam 502 passes from tip/tilt corrector 908 to deformable mirror 900 where distortions are corrected in accordance with the invention and thence to the wavefront sensor 500 described in FIG. 5.

This completes the description of one embodiment of the invention. It should be understood, however, that this invention is not limited to the "n"-faceted reflective prism embodiment heretofore described. Other equivalent structures are included within the scope of this invention. For example, a second preferred embodiment is shown in FIG. 10.

In this embodiment, the "n"-sided prism is replaced by a planar mask 910 of "n"-segments (preferably "n"=4). Two segments, 900 and 902, are light transmissive and two, 901 and 903, are light reflective. After nutation as in FIG. 5, the light is focused by lens 908 at the full aperture, onto the center of the mask. The focused light is nutated on the mask. The light transmitted through mask segments 900 and 902 is collimated by lens 914 and impinges on detector array 904. This detector array is made up of "S" detector elements, one for each subaperture.

For ease in description, array 904 is shown with 25 such detector elements S(1)–S(25). Similarly, the nutated light beam passing through lens 908 which impinges on mask segments 901 and 903 is reflected into collimating lens 916 and impinges on detector array 906 which is also comprised of 25 subaperture detector elements S(1)–S(25). As was explained in connection with FIGS. 4a and 4b, to the extent the incoming beam is undistorted the light focused from lens 908 onto mask 910 will be focused at the intersection or center of the mask. Nutating this spot about its axis will therefore result in an output signal 920 as shown in FIG. 11 from the detector arrays. Both halves of the signal 920 will be seen to be of equal amplitude since the beam will have impinged or dwelled on the reflective and non-reflective surfaces an equal amount of time.

Next, consider the case of a distorted beam; illustrated by the dotted lines in FIGS. 10 and 11. The distorted beam (or a segment thereof) will be focused at a point, such as 909 of FIG. 10, off-set from the center by the amount of tilt in the beam. As this beam is nutated about the plane of the mask, as shown by dotted line 911, it may be seen that most of the time the beam will reside or dwell in segment 900; therefore, an "S" detector in array 904 will receive more light radiation than a corresponding "S" detector in array 906. This unequal division which is sensed by the detectors is used to generate the sinusoidal signal shown in dotted line 921 of FIG. 11 from which it can be seen that the difference in amplitude between the two halves of the sinusoidal signal is proportional to the wavefront tilt.

Referring back to FIG. 12 and the analytic discussion theref, it can be shown that the energy transmitted through the mask 910 of FIG. 10 is the sum of the signal currents in quadrants I and III or $(i_I + i_{III})$. Similarly, the reflected light from the mask 910 equals $i_{II} + i_{IV}$. If the reflected light signal is subtracted from the transmitted signal, the resulting signal is equal to $K(4c)$; which as previously shown in connection with FIG. 12 and Equation 9 yields $\Delta x$ and $\Delta y$ dependent results when correlated with $\cos \omega t$ and $\sin \omega t$. Since, from Equation 10, $$4c = \Delta x p \sin \theta + \Delta y p \cos \theta + p^2 \sin 2\theta,$$

the power term can be obtained by correlating the detected signal with $\sin 2\theta$.

The mask in FIG. 10 may be modified in accordance with the invention to correspond to, or maximize, a predetermined function of the object to the imaged. For example, if the object is square in shape, the mask could be a square reflective pattern surrounded by a transparent area. In some applications, a checkerboard pattern may be used. For greatest flexibility it may be desirable to provide a mask which acts as an optically matched filter, such as a mosaic of liquid crystal devices whose transmissivity can be varied electrically.

This completes the description of the preferred embodiments of the invention. Those skilled in the art may recognize other equivalent embodiments to those described herein; which equivalents are intended to be encompassed by the claims attached hereto.

We claim:

1. Wavefront distortion sensing apparatus comprising:
   (a) focusing means for focusing a first wavefront beam of energy onto a beam divider means;
   (b) nutating means for nutating said first beam in a predetermined manner;
   (c) beam divider means located at the focal point of said focusing means, said beam divider means forming "n"-separate beams corresponding to said first beam, where "n" is a number greater than 1;
   (d) "n"-detector arrays each of which is associated with one of said "n"-separate beams such that energy from each "n"-separate beams impinges on one of each "n"-detector arrays; and
   (e) "S" detector elements in each array for detecting the amount and distribution of the beam energy at "S" points in the wavefront of energy impinging on each array and wherein "S" is greater than one.

2. The apparatus of claim 1 in which the beam divider means is an "n"-faceted prism.

3. The apparatus of claim 2 in which "n" is at least 4.

4. The apparatus of claim 1 in which the beam divider means is a mask having alternate reflective and transparent surfaces.

5. The apparatus of claim 2 in which the reflectivity and transparency of the surfaces may be varied.

6. The apparatus of claim 4 in which "n" is at least 2.

7. The apparatus of claim 1 in which the nutation of the first beam causes a sinusoidal output signal from the detector elements.

8. The apparatus of claim 7 in which a reference beam is combined with the first beam.

9. The apparatus of claim 8 in which the energy detected at the detector elements is combined in accordance with a predetermined formula and is used to correct distortions in the first beam.

10. The apparatus of claim 8 in which the energy detected from the reference by the detector elements is used to stabilize the optical beam path.

11. The apparatus of claim 7 in which the signal generated by nutation is combined with a signal obtained by averaging the detector output signals thereby producing a composite indication of object displacement.

12. The apparatus of claim 1 in which the energy substantially in the optical wavelength from infra-red to ultra-violet.

13. The method of determining wavefront tilt in a light beam by:
   (a) focusing the light beam onto an optical divider;

(b) dividing the beam into "n"-separate beams by said optical divider;

(c) focusing the wavefront pupil onto "n"-photodetector arrays where "n">1, each of which is disposed in a plane conjugate to the input pupil of the light beam and each of which comprises "S"-photodetectors, where "S">1;

(d) detecting the intensity of light impinging on each "S"-photodetector; and (e) comparing the intensity of corresponding "S"-photodetectors in each "n"-array.

14. The method of claim 13 including the additional step prior to step (b) of nutating the light beam before it is divided.

15. The method of claim 13 including the additional steps of:

(f) combining the light beam of step (a) with a modulated reference beam before step b; and (g) after step (d) using the reference beam to calibrate each of the "n"-detector arrays.

16. The method of claim 15 including the step of stabilizing the optical beam path using the reference beam.

17. The method of claim 13 including the step of electronically processing the signal generated in step (e) by correlating said signal with a predetermined function to enhance the signal.

18. The method of claim 17 in which the correlating signal is used to enhance the signal from a selected feature of an image of an object.

19. The method of claim 17 in which the correlation comprises multiplying the detected signals in each quadrant by the following set of functions:

|  | for $\Delta x$ | for $\Delta y$ |
|---|---|---|
| $\Delta_{Ix,y}(t) =$ | $1 + \sin\omega t$ | $1 + \cos\omega t$ |
| $\Delta_{IIx,y}(t) =$ | $-1 - \sin\omega t$ | $1 - \cos\omega t$ |
| $\Delta'_{IIIx,y}(t) =$ | $-1 + \sin\omega t$ | $-1 + \cos\omega t$ |
| $\Delta_{IVx,y}(t) =$ | $1 - \sin\omega t$ | $-1 - \cos\omega t$ |
| $P_{Ix,y}(t) =$ | $1 + \sin\omega t$ | $1 + \cos\omega t$ |
| $P_{IIx,y}(t) =$ | $1 + \sin\omega t$ | $1 - \cos\omega t$ |
| $P_{IIIx,y}(t) =$ | $1 - \sin\omega t$ | $1 - \cos\omega t$ |
| $P_{IVx,y}(t) =$ | $1 - \sin\omega t$ | $1 + \cos\omega t$; | where
$\Delta_{Ix,y}(t)$ = displacement signal of quadrant I
$\Delta_{IIx,y}(t)$ = displacement signal of quadrant II
$\Delta_{IIIx,y}(t)$ = displacement signal of quadrant III
$\Delta_{IVx,y}(t)$ = displacement signal of quadrant IV
$P_{Ix,y}(t)$ = power normalizing signal of quadrant I
$P_{IIx,y}(t)$ = power normalizing signal of quadrant II
$P_{IIIx,y}(t)$ = power normalizing signal of quadrant III
$P_{IVx,y}(t)$ = power normalizing signal of quadrant IV.

20. An optical system for correcting light beam distortion comprising:

(a) focusing means for focusing said light beam at a predetermined point on an optical divider where said beam is divided into "n"-reflected beams, where "n">1;

(b) "n"-detector arrays each of which is in the path of one of said "n"-reflected beams each array having "S" subapertures where "S">1; and (c) each array having at least one detector element corresponding to each of the "S" subapertures of the light beam to be corrected; said detector elements being sensitive to the quantity of light impinging thereon.

21. Apparatus comprising in combination:

(a) imaging means for focusing a light beam of an image of an object onto a beam dividing means whereby the image is divided into "n"-parts, in which "n" is greater than 1;

(b) "n"-detector arrays each having "S"-detector elements, where "S" is equal to or greater than 2;

(c) one each of said arrays being associated with one each of said "n"-parts such that each of the "n"-parts is detected by a plurality of detector elements; and (d) combining means for combining the signals detected by said "S"-detectors to form an electrical signal proportional to the amount of distortion of said focused image.

22. The apparatus of claim 21 in which a reference beam is combined with said light beam.

23. The apparatus of claim 21 in which the "n" detector arrays include an electron beam-photon coupled device having an image intensifier optically coupled by a fiber optic bundle to a detector array.

24. The apparatus of claim 21 in which the optical path is stabilized using the reference beam.

25. The apparatus of claim 21 in which the beam dividing means comprises a plurality of contiguous faces meeting at a junction and the light beam is focused onto the junction and nutated.

26. The apparatus of claim 25 in which the beam dividing means is a prism and the light beam is focused onto the apex of the prism.

27. Apparatus comprising in combination:

(a) imaging means for focusing a light beam of an image of an object onto a beam dividing means whereby the image is divided into "n"-parts, in which "n" is greater than 1;

(b) "n"-detector arrays each having "S"-detector elements, where "S" is equal to or greater than 2;

(c) one each of said arrays being associated with one each of said "n"-parts such that each of the "n"-parts is detected by at least one detector element in each of the "n"-detector arrays;

(d) combining means for combining the signals detected by said "S"-detectors to form an electrical control signal proportional to the amount of distortion of said focused image;

(e) nutating means for rotating said light beam about said beam dividing means so that the control signal from the combining means alternates in polarity;

(f) processing means for applying a signal proportional to a stored algorithm to said control signal to optimize the signal in accordance with an "a priori" knowledge of a characteristic of the object being imaged.

28. The apparatus of claim 27 in which the beam dividing means is a prism.

29. The apparatus of claim 27 in which the beam dividing means is a mask.

30. The apparatus of claim 27 in which the stored algorithm is:

|  | for $\Delta x$ | for $\Delta y$ |
|---|---|---|
| $\Delta_{Ix,y}(t) =$ | $1 + \sin\omega t$ | $1 + \cos\omega t$ |
| $\Delta_{IIx,y}(t) =$ | $-1 - \sin\omega t$ | $1 - \cos\omega t$ |
| $\Delta'_{IIIx,y}(t) =$ | $-1 + \sin\omega t$ | $-1 + \cos\omega t$ |
| $\Delta_{IVx,y}(t) =$ | $1 - \sin\omega t$ | $-1 - \cos\omega t$ |
| $P_{Ix,y}(t) =$ | $1 + \sin\omega t$ | $1 + \cos\omega t$ |
| $P_{IIx,y}(t) =$ | $1 + \sin\omega t$ | $1 - \cos\omega t$ |
| $P_{IIIx,y}(t) =$ | $1 - \sin\omega t$ | $1 - \cos\omega t$ |
| $P_{IVx,y}(t) =$ | $1 - \sin\omega t$ | $1 + \cos\omega t$. |